United States Patent [19]
Blanchard et al.

[11] Patent Number: 5,289,277
[45] Date of Patent: Feb. 22, 1994

[54] HIGH DEFINITION TELEVISION SIGNAL FORMAT CONVERTER

[75] Inventors: David L. Blanchard, Des Plaines; Raymond C. Hauge, Fox River Grove; Ronald B. Lee, Northbrook; Paul A. Snopko, Chicago; Frank C. Templin, Arlington Heights, all of Ill.; Jong G. Kim, Seoul, Rep. of Korea; Dong H. Lee, Seoul, Rep. of Korea; In S. Lee, Seoul, Rep. of Korea; Moon K. Lee, Seoul, Rep. of Korea

[73] Assignee: Zenith Electronics Corp., Glenview, Ill.

[21] Appl. No.: 972,260

[22] Filed: Nov. 5, 1992

[51] Int. Cl.$^5$ .............................................. H04N 5/92
[52] U.S. Cl. .................................................. 348/441
[58] Field of Search ............. 358/140, 320, 310, 335, 358/319, 141, 142; 360/22, 33.1; H04N 5/92, 5/93

[56] References Cited
U.S. PATENT DOCUMENTS

| | | | |
|---|---|---|---|
| 4,213,149 | 7/1980 | Janko | 358/153 |
| 4,780,769 | 10/1988 | Numakura et al. | 358/320 |
| 5,175,631 | 12/1992 | Juri et al. | 358/335 |

FOREIGN PATENT DOCUMENTS 0414993 3/1991 European Pat. Off. .
0473412 3/1992 European Pat. Off. .

Primary Examiner—Victor R. Kostak
Assistant Examiner—Nathan J. Flynn

[57] ABSTRACT

A high definition television transmitting system includes a source of high definition analog RGB video signals which are converted to corresponding digitally encoded signals and thereafter compressed by a video encoder to a six megahertz bandwidth. The compressed data is formatted by a transmitter and processed in accordance with a Reed-Solomon error control system for broadcast as an NTSC-type broadcast signal. A high definition television receiver includes a high definition signal receiver coupled to the transmitter by a transmission link. The receiver extracts the compressed video, audio and ancillary data signals and applies a Reed-Solomon error correction thereto. The compressed video data is reconstructed by a video decoder and processed for high definition display. A high definition digital video tape recorder is coupled to the transmitter by an interface and format converter facilitating both recording and playback functions of the digital video tape recorder while maintaining the Reed-Solomon error control. The format converter provides compatibility between the high definition transmitter and the digital video tape recorder.

20 Claims, 4 Drawing Sheets

HIGH DEFINITION TELEVISION SIGNAL FORMAT CONVERTER

CROSS REFERENCE TO RELATED APPLICATIONS

This application is related to a copending application entitled DIGITAL VIDEO TAPE RECORDER INTERFACE FOR HIGH DEFINITION TELEVISION SYSTEM filed abandoned Nov. 5, 1992, having Ser. No. 07/971,783 and a copending application entitled VIDEO RECORDER INTERFACE FOR HIGH DEFINITION TELEVISION SYSTEM filed Nov. 5, 1992, having Ser. No. 07/972,042 both of which are assigned to the assignee of the present application and both which are hereby incorporated herein by reference.

1. Field of the Invention

This invention relates generally to high definition television systems and particularly to digital high definition video tape recorders used therein.

2. Background of the Invention

Standard television broadcast formats such as the NTSC system used in the United States of America readily facilitate program taping or recording for subsequent use. The NTSC signal, for example, is an analog signal in which the baseband video frequency bandwidth is six megahertz. Thus, NTSC television receivers and recorders are easily made compatible since video tape recording systems operate very well in response to analog signals and because the six megahertz bandwidth of the NTSC signal is well within the response frequency of currently available tape and tape recorders. In addition to high quality studio grade tape recorders, lower cost consumer grade recorders often referred to as video cassette recorders (VCR) are readily available to the consumer.

In contrast, high definition television systems often referred to as HDTV, use digitally encoded signals having extremely high clock signal frequencies which are not directly compatible with the conventional video recording processes. In addition, in order to be so-called "spectrum compatible", high definition television systems are required to fit more high frequency video information into the standard six megahertz transmission channel bandwidth to achieve their high resolution or high definition performance. To meet this requirement, sophisticated data compression operations are performed upon the digitally encoded video signals prior to broadcast. The resulting combination of high clock frequency digitally encoded signals and complex highly sophisticated data compression operations render the high definition television signal extremely difficult to record.

Faced with these difficulties, there arises a need for a reliable cost effective system for recording high definition television signals. Meeting this need will require the capability to perform signal format conversion to maintain compatibility between system components.

Accordingly, it is a general object of the present invention to provide an improved system for recording high definition television signals. It is a more particular object of the present invention to provide a signal format converting system for use in combination with digital video tape recorder interfaces in high definition television systems which facilitates the reliable recording of high definition television signals.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
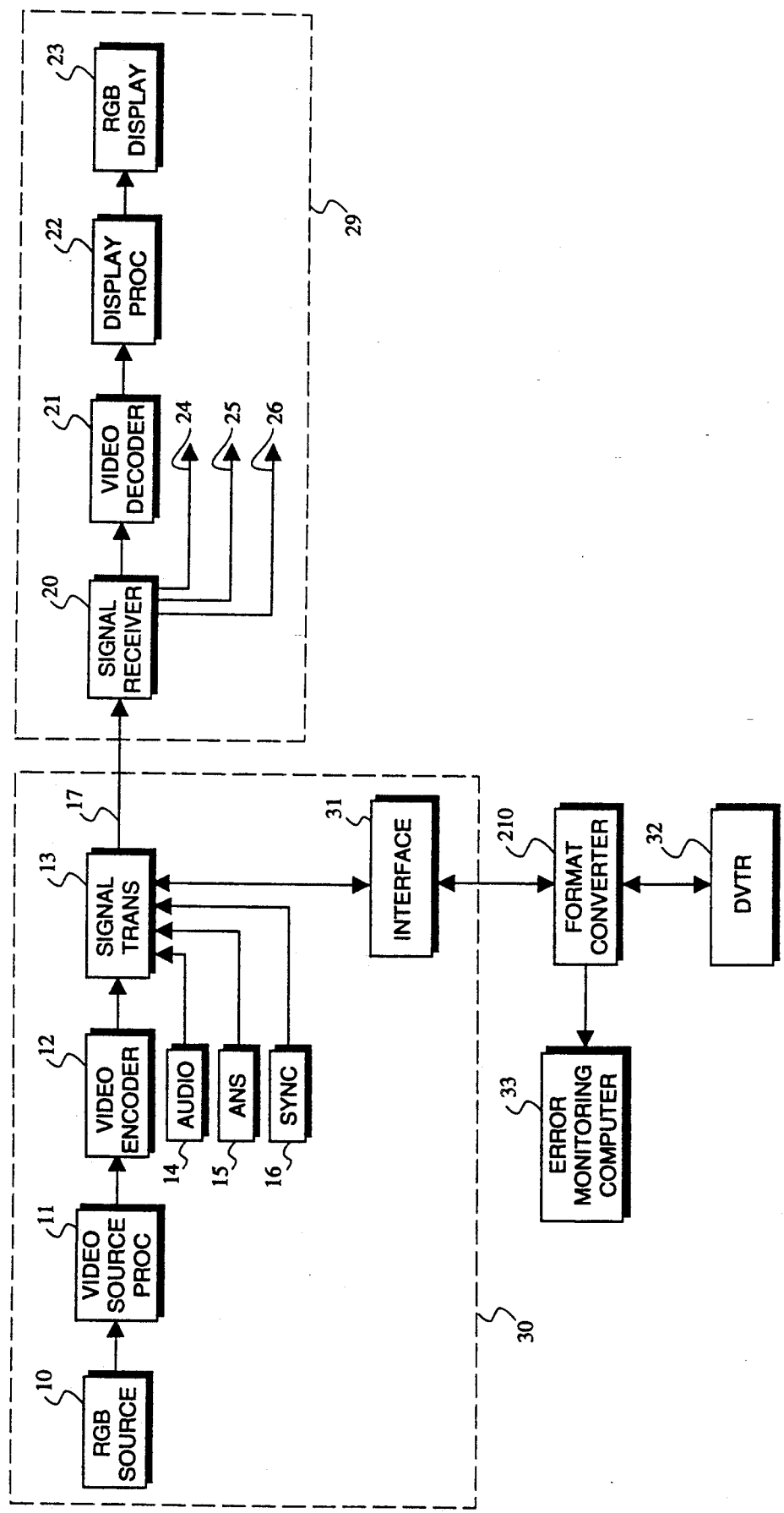
FIG. 1 sets forth a block diagram of a high definition television recording system and digital video tape recorder constructed in accordance with the present invention.

FIG. 1 sets forth a block diagram of a high definition television system constructed in accordance with the present invention. A high definition transmitting system 30 includes a high definition video source 10 coupled to a video processor 11, the output of which is coupled to a video encoder 12. Video encoder 12 is coupled to a signal transmitter 13 In addition, a source of digitally encoded audio information 14, together with a source of digitally encoded ancillary data 15 is also coupled to signal transmitter 13. A source of system synchronizing signals 16 is coupled to HDTV signal transmitter 13. Transmitting system 30 is coupled to a high definition television receiver generally referenced by numeral 29 by a transmission channel link 17. In accordance with the present invention, a high definition digital video recorder interface 31 is coupled to transmitter 13, and a format converter 210 is coupled to the output of interface 31. A high definition digital video tape recorder 32 is coupled to the output of the format converter 210. An error monitoring computer 33 is coupled to format converter 210.

Television receiver 29 includes a high definition signal receiver 20 coupled to transmission channel 17. Signal receiver 20 provides an encoded out audio output 24, an encoded ancillary data output 25, and a scan synchronizing signal output 26. Signal receiver 20 is further coupled to a high definition television video decoder 21, the output of which is coupled to a video display processor 22. Processor 22 is coupled to a high definition television display 23.

In operation, high definition video source 10 provides a set of analog high definition RGB video signals. In their preferred form, the baseband frequency bandwidth for the RGB video signals produced by source 10 is approximately thirty four megahertz and thus provides the desired high definition or high resolution character for the video signal. The output RGB video signals from source 10 are coupled to video source processor 11 which filters the applied RGB video signals and performs an analog to digital conversion to produce a digitally encoded high definition television signal. Because of the thirty four megahertz bandwidth for the baseband video signals and other system needs, the analog to digital conversion performed by processor 11 is carried forward using a high clock frequency of 4788H, 4788 times horizontally, approximately seventy-five megahertz. The digitally encoded high definition television video signal produced by processor 1 is coupled to video encoder 12 which performs complex data compression processes necessary to compress the digital signal into a six megahertz bandwidth signal capable of transmission within a standard NTSC channel bandwidth of six megahertz. In performing this data compression, encoder 12 generates motion vectors, discrete cosine transform (DCT) coefficient data, and other coding information which, as is set forth below, is used by the high definition television video decoder within the receiver (video decoder 21) to reconstruct the video signals. The output signal from video encoder 12 is coupled to high definition television HDTV signal transmitter 13. A compressed digital audio signal from source 14 is also supplied to transmitter 13. Vertical and horizontal scan synchronizing signals together with certain ancillary data set forth below in greater detail are produced by sync system 16 and data system 15 respectively and are also supplied to transmitter 13. Transmitter 13 formats the compressed video signal together with compressed audio, scan synchronizing signals and ancillary data into a transmission signal format suitable for transmission within a six megahertz NTSC transmission channel. In addition, signal transmitter 13 provides error control information, called parity bytes, for operation of the Reed-Solomon error control systems operative within signal transmitter 13 and high definition television receiver 20. As a final step, HDTV signal transmitter 13 performs the transmission channel data encoding and applies the encoded high definition television signal to transmission channel 17 which is used to transmit or otherwise couple the completed signal to high definition television receiver 29.

In accordance with an important aspect of the present invention, a format converter 210 is coupled to the digital video tape recorder interface 31 and receives the compressed audio, video and ancillary information signals which are processed by encoder 12 together with the Reed-Solomon error control information signals and applied to signal transmitter 13. Format converter 210 is coupled to high definition digital video tape recorder 32 which, as is set forth below, provides both record and playback functions. In accordance with an important aspect of the present invention described below in greater detail, the digitally encoded high definition television signals coupled by interface 31 and the format converter 210 to high definition DVTR 32 are taken from signal transmitter 13 following the operation of the Reed-Solomon error control system within signal transmitter 13. Thus, the digitally encoded information has the benefit of the completed Reed-Solomon error control initiated by the system within signal transmitter 13. It should be noted that the error control process of the transmitted signal is completed by the Reed-Solomon error correction system within signal receiver 20. Conversely, as is also set forth below in greater detail, the coupling between interface 31 and signal transmitter 13 during the playback operation of DVTR 32 is altered to insert the high definition digitally encoded signals into the circuitry of signal transmitter 13 at a point ahead of its Reed-Solomon error control system. Thus, the signals delivered by DVTR 32 in the playback mode also receive the benefit of the error control system operation before being transmitted.

One of the characteristics of the operation of the Reed-Solomon error correction system is the loss of the synchronizing signal information. Accordingly, one of the important functions of interface 31 is the provision of the required synchronizing signal information to overcome this difficulty. To accomplish this, interface 31 uses a vertical sync signal which is added in parallel to the video data during record and used after playback to recreate the synchronization signals.

At high definition television receiver 29, signal receiver 20 is operatively coupled to transmission channel 17 and receives the transmitted high definition television signal produced by signal transmitter 13. Signal receiver 20 performs a channel decoding function in which it extracts the compressed audio, video and ancillary signals from the transmitted high definition television signal. In addition, receiver 20 performs error correction utilizing a Reed-Solomon error control system operating in accordance with the error control information inserted into the transmitted signal by signal transmitter 13. In addition, the clock signal used by processor 11 together with the horizontal and vertical synchronizing signals are also recovered from the received signal by signal receiver 20. The compressed digital audio output signal, the recovered ancillary data signal, and the horizontal and vertical scan synchronizing signals are provided to the appropriate signal processors (not shown) at outputs 24, 25 and 26 of signal receiver 20. The compressed high definition video signal is coupled to video decoder 21 which utilizes the motion vectors and DCT coefficient data and other coding information inserted into the transmitted signal by video encoder 12 to decompress or expand the compressed video signal and provide a reconstruction of the original digitally encoded high definition video signal. This digitally encoded video signal is applied to video display processor 22 which performs a digital to analog conversion of the reconstructed digital video signal using the recovered seventy five megahertz clock signal to reproduce the high definition analog RGB video signals. The analog RGB video signals are then applied to a display 23 together with the horizontal and vertical scan synchronizing signals to produce a viewable high definition television display.

Figure 2:
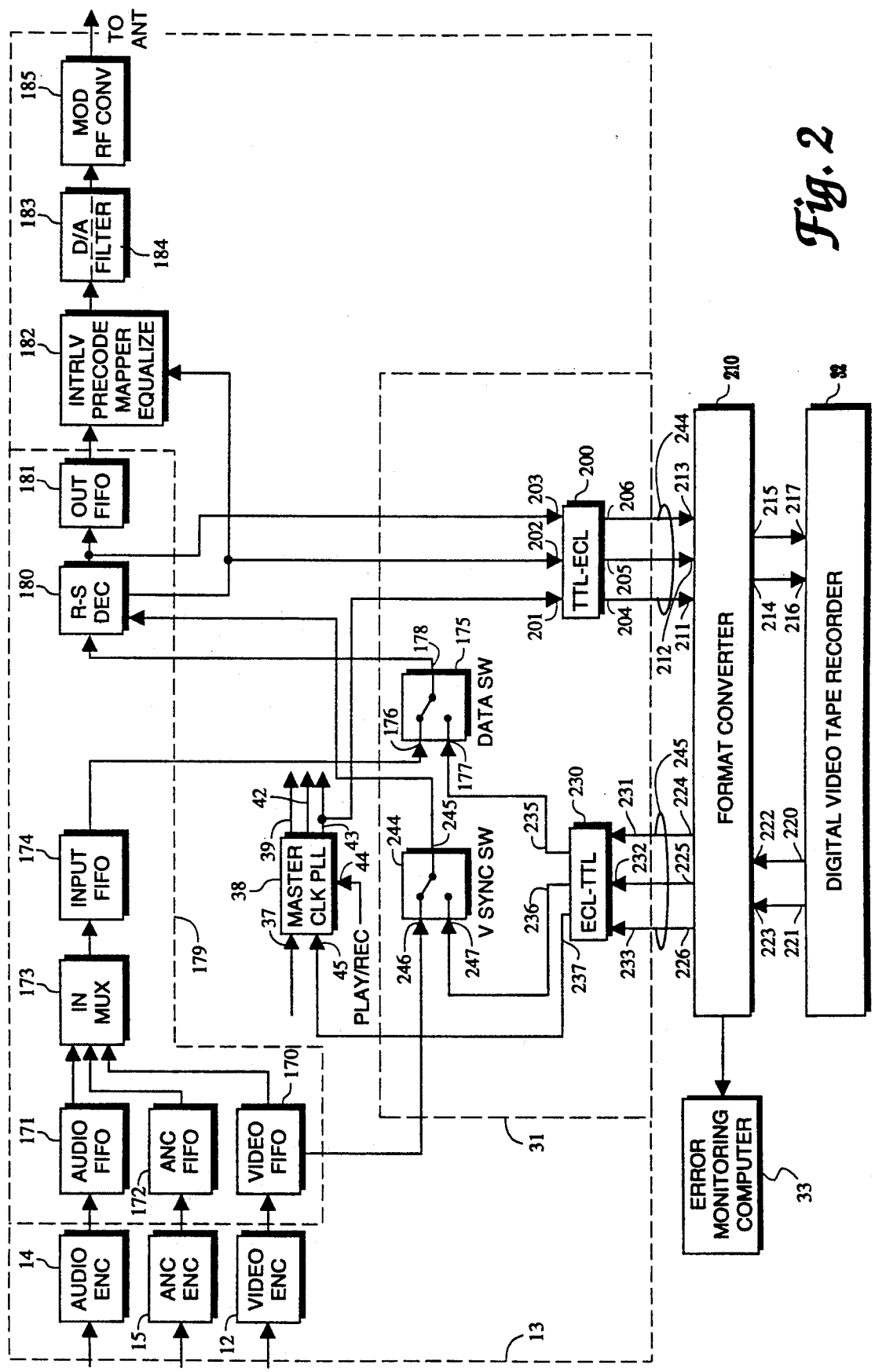
FIG. 2 sets forth a more detailed block diagram of a digital video tape recorder and an interface therefor using the present invention format converter.

FIG. 2 sets forth a block diagram of a video tape recorder interface together with the present invention format converter and related portions of the high definition television transmitter of FIG. 1. A video encoder 12 is coupled to video source processor 11 (seen in FIG. 1) and produces an encoded video signal coupled to a FIFO memory 170. The output of FIFO memory 170 is coupled to an input multiplexing circuit 173. In addition, a source of encoded audio data 14 is coupled to input multiplexing circuit 173 by a FIFO memory 171 and a source of encoded ancillary data 15 is also coupled to input multiplexing circuit 173 by a FIFO memory 172. The output of multiplexing circuit 173 is coupled to an input FIFO memory 174, the output of which is coupled to input 176 of switch 175. Switch 175 includes an output 178 coupled to a Reed-Solomon error correction encoder 180. The switch is shown in the record position. The output of encoder 180 is coupled to an output FIFO memory 181, the output of which is coupled to a processor 182. Processor 182 performs interleaving operations as well as precoding, mapping and signal equalizing to produce an output data signal which is coupled to a digital to analog converter 183 The analog signal output of converter 183 is coupled to a modulator and RF converting circuit 185 through a filter 184. Modulating and RF converting circuit 185 is coupled to a conventional power amplifying and transmitting antenna system (not shown) or, in the event of cable transmission, to a suitable cable distribution system. Transmitter vertical sync 305 is coupled from video source processor 11 to vertical sync switch 240. During record operations, the vertical sync switch 240 output is coupled to the mapper in 182 to provide synchronization. The vertical sync signal is a composite sync signal that contains both vertical and horizontal timing information. The vertical VTR vertical sync signal 237 is also coupled to vertical sync switch 240. During playback operations, the switch 240 output is coupled to the mapper in 182. The 4788H clock 192 is coupled from video source processor 11 to the master clock PLL 190. During record operations, clock 192 provides the synchronization for PLL 190. The VTR 171H clock 191 is also coupled to PLL 190. During playback operations, clock 191 provides synchronization for PLL 190. PLL 190 provides data clocks 171H 193 and 684H 194, for the operations of processor 182. Clock 171H 193 is coupled to interface 31 for use during record operations. Vertical sync 305 is also coupled to interface 31 for use during recording operations.

A video tape recorder interface 31 includes a transistor-transistor-logic (TTL) to emitter-coupled-logic (ECL) converter 200 having a data input 201 coupled from the output of Reed-Solomon encoder 180, an input 202 coupled from PLL 190, and an input 203 coupled from the vertical sync signal 305. Converter 200 performs a conversion of the applied input signals from the transistor-transistor-logic format to the emitter-coupled-logic format required by cable system 244. Thus, converter 200 includes a data output 204, a clock signal output 205 and a vertical sync signal output 206. A format converter 210 includes a data input 211 coupled from output 204 of converter 200, a clock signal input 212 coupled from clock signal output 205 of converter 200, and a vertical sync signal input 213 coupled from output 206 of converter 200. Format converter 210 further includes a data output 214 coupled to input 216 of video tape recorder 32 and a sync signal output 215 coupled to input 217 of recorder 32. An error monitoring computer 33 is coupled to format converter 210. Video tape recorder 32 includes a data output 220 coupled to input 222 of converter 210 and a sync signal output 221 coupled to input 223 thereof. Format converter 210 further includes a data output 224, a clock signal output 225, and a vertical sync signal output 226.

Interface 31 further includes a logic converter 230 having a data input 231, a clock signal input 232, and a vertical sync signal input 234. Inputs 231, 232 and 234 of logic converter 230 are coupled from outputs 224, 225 and 226 respectively of format converter 210. Logic converter 230 converts the applied emitter-coupled-logic signals from cable system 245 back to transistor-transistor-logic signals in accordance with the processing needs of the remainder of transmitter 13. Thus, logic converter 230 may be thought of as the reciprocal converter of logic converter 200. Data output 235 of logic converter 230 is coupled to input 177 of switch 175. VTR vertical sync signal 237 is coupled via vertical sync switch 240 to mapper in 182 during playback operations. VTR 171H clock 191 is coupled to PLL 190 to serve as a synchronization signal during playback operations.

In operation, the digitally encoded high definition video signals produced by video source processor 11 (seen in FIG. 1) are further processed by video encoder 12 in accordance with data compression operations to produce a digitally encoded compressed data signal which is compatible with the six megahertz bandwidth of an NTSC television channel. The compressed digitally encoded video signal output from encoder 12 is passed through FIFO memory 170 to change the clock signal frequency of the video data to a clock signal which facilitates processing by multiplexing circuit 173. Similarly, the encoded audio signal from source 14 and the encoded ancillary data from source 15 are reclocked by FIFO memory 171 and 172 respectively to the same clock signal frequency required by multiplexing circuit 173. Multiplexing circuit 173 multiplexes or combines the three applied data signals from FIFO memory 170, 171 and 172 into a single combined data stream. This data stream is reconverted to the clock signal frequency required by Reed-Solomon encoder 180 by FIFO memory 174 and applied to the record input of switch 175. Switch 175 provides data switching of the data input to Reed-Solomon encoder 180 between transmitter 13 and video tape recorder 32. In the position shown, switch 175 couples the input of Reed-Solomon encoder 180 to the reclocked data signal output of FIFO memory 174. Reed-Solomon encoder 180 processes the applied compressed video and audio data in blocks of one hundred and forty seven bytes. The encoder analyzes the one hundred and forty seven bytes and, by means of an algorithm stored therein, generates twenty parity bytes that are mathematically related to the one hundred and forty seven data bytes. The encoder outputs a data stream of one hundred and forty seven data bytes together with the twenty parity bytes to produce data in blocks of one hundred and sixty seven bytes. The data output of Reed-Solomon encoder 180 is reclocked to the clock signal frequency required by interleaver 182 by output FIFO memory 181. The output of FIFO memory 181 is further processed by a processor 182 within which four additional synchronizing signal bytes are added to each data block to produce a succession of one hundred and seventy one byte data blocks which are formatted and transmitted as successive lines of data each corresponding to an NTSC horizontal scan interval. In addition, processor 182 provides interleaving precoding and equalizing processes for the data stream. The data signal output of processor 182 is converted to a corresponding analog signal by digital to analog converter 183 and thereafter filtered by filter 184 to provide the appropriate frequency response. The filtered output signal is then applied to a channel modulator and RF converter 185.

Transmitter 13 includes a master clock PLL 190 which generates the data clocks 171H 193 and 684H 194 for the operation of the transmitter circuits. It has been found advantageous to utilize transmitter clock 192 at 4788H, 4788 times the NTSC horizontal frequency, approximately 75 MHz. Clock 192 serves as the input synchronization signal for PLL 190 during record operations. The transmitter vertical sync signal 305 is a composite sync signal that contains both vertical and horizontal timing information. The vertical sync signal is utilized by processor 182 in providing the above-described four sync bytes added to each horizontal scan line organized data block. It should be noted that at the receiver the four sync bytes are recovered and used to reconstruct horizontal sync and vertical sync signals to properly synchronize the receiver display to the video and audio data.

In accordance with an important aspect of the present invention, interface 31 is coupled to signal transmitter 13 at a data processing point which has received the benefit of Reed-Solomon error control. Thus, data input 201 of logic converter 200 is coupled from the output of Reed-Solomon encoder 180. The applied data stream therefore has received the error control processing benefit and is thus more reliable. Because the operation of Reed-Solomon encoder 180 ignores the synchronizing signal data bytes, synchronizing information must be added in parallel to the data stream after Reed-Solomon error correction. In accordance with an important aspect of the present invention, interface 31 provides for insertion of sufficient synchronizing signal information in parallel with the to-be-recorded data to facilitate the proper synchronizing of the recorded signal. Thus, logic converter 200 includes an input 202 coupled from clock circuit 191 and an input 203 coupled from the vertical sync signal 190. As mentioned above, the logic format utilized by high definition transmitter 13 is that referred to as transistor-transistor-logic. In contrast, cable system 244 utilizes a logic format known as emitter-coupled-logic. Thus, logic converter 200 provides a logic conversion from transistor-transistor-logic to emitter-coupled-logic producing output signals at output 204, 205 and 206 which correspond to input signals 201, 202 and 203 respectively. The emitter-coupled-logic output signals of logic converter 200 are processed by format converter 210 to produce data and synchronizing signals for recording by video tape recorder 32. The operation of format converter 210 is set forth in greater detail in FIGS. 3A and 3B below. However, suffice it to note here that the input data to format converter 210 comprises a parallel data stream having a data clock signal frequency corresponding to clock circuit 191 together with the vertical sync signal 190. Format converter 210 converts this applied input signal to an NTSC composite parallel data signal having a clock signal frequency four times the NTSC chrominance carrier frequency which is compatible with video tape recorder 32. Video tape recorder 32 comprises a composite digital studio video tape recorder such as that manufactured by Panasonic Broadcast Systems Company, a division of Matsushita Electric Corporation of America and having a Model Number AJ-D350. Recorder 32 provides high quality studio-type video tape recording of digital signals and has sufficient speed and information processing capability to faithfully record the compressed data high definition television signals processed by transmitter 13.

Thus, in the record mode, the error protected compressed digital signals processed by transmitter 13 are formatted by format converter 210 and recorded upon the tape medium within video tape recorder 32. In accordance with an important aspect of the present invention, the recording process includes the Reed-Solomon error control benefits of encoder 180 while providing for the inclusion of appropriate synchronizing data to properly synchronize the recorded information. Video tape recorder 32 includes a multi-head playback and record tape transport system. Thus, the applied data signals from format converter 210 are stored upon a tape medium and may be reproduced during the playback operation of video tape recorder 32 to produce output signals at outputs 220 and 221 which correspond closely to reproductions of the originally recorded signals at input 216 and 217 respectively.

As is set forth below in greater detail in conjunction with FIGS. 3A and 3B, format converter 210 is operative during the playback operation of video tape recorder 32. The recovered playback signals are reconverted by format converter 210 from the NTSC composite parallel data having a clock frequency four times the NTSC chrominance subcarrier to parallel data having a clock frequency one hundred and seventy one times the horizontal scan frequency together with the vertical sync signal. In addition, format converter 210 also outputs the clock signal. Logic converter 230 reconverts the emitter-coupled-logic inputs at inputs 231, 232 and 233 to the transistor-transistor-logic format required by transmitter 13. Thus, the transistor-transistor logic formatted data signal at output 235 is coupled to switch 175 while the clock signal output and vertical sync signals are coupled to PLL 190 and switch 240, respectively.

Thus, during the playback mode, switch 175 couples the data input of Reed-Solomon encoder 180 from logic converter 230 while vertical sync 237 supplies the required synchronization information to the mapper in 182. The error controlled output signal of Reed-Solomon encoder 180 is reclocked by FIFO memory 181 in the manner described above and thereafter processed by processor 182, digital to analog converter 183, filter 184, and modulator and RF converter 185 to produce a to-be-transmitted high definition television signal.

Thus, interface 31 maintains proper synchronizing information during both the record and playback operations of video tape recorder 32 while also maintaining the beneficial Reed-Solomon error control function during both processes. As a result, the transmitted high definition television signal processed by transmitter 13 enjoys the benefits of Reed-Solomon error control whether the transmitted information is obtained from the high definition RGB source or comprises prerecorded information provided by the digital video tape recorder. Because the operation of format converter 210 and interface 31 facilitates the use of the Reed-Solomon apparatus within the high definition transmitter, additional Reed-Solomon error control apparatus is not required within the video tape recorder itself. The Reed-Solomon parity bytes are recorded on the tape for later use by the Reed-Solomon hardware during playback.

Figure 3A:
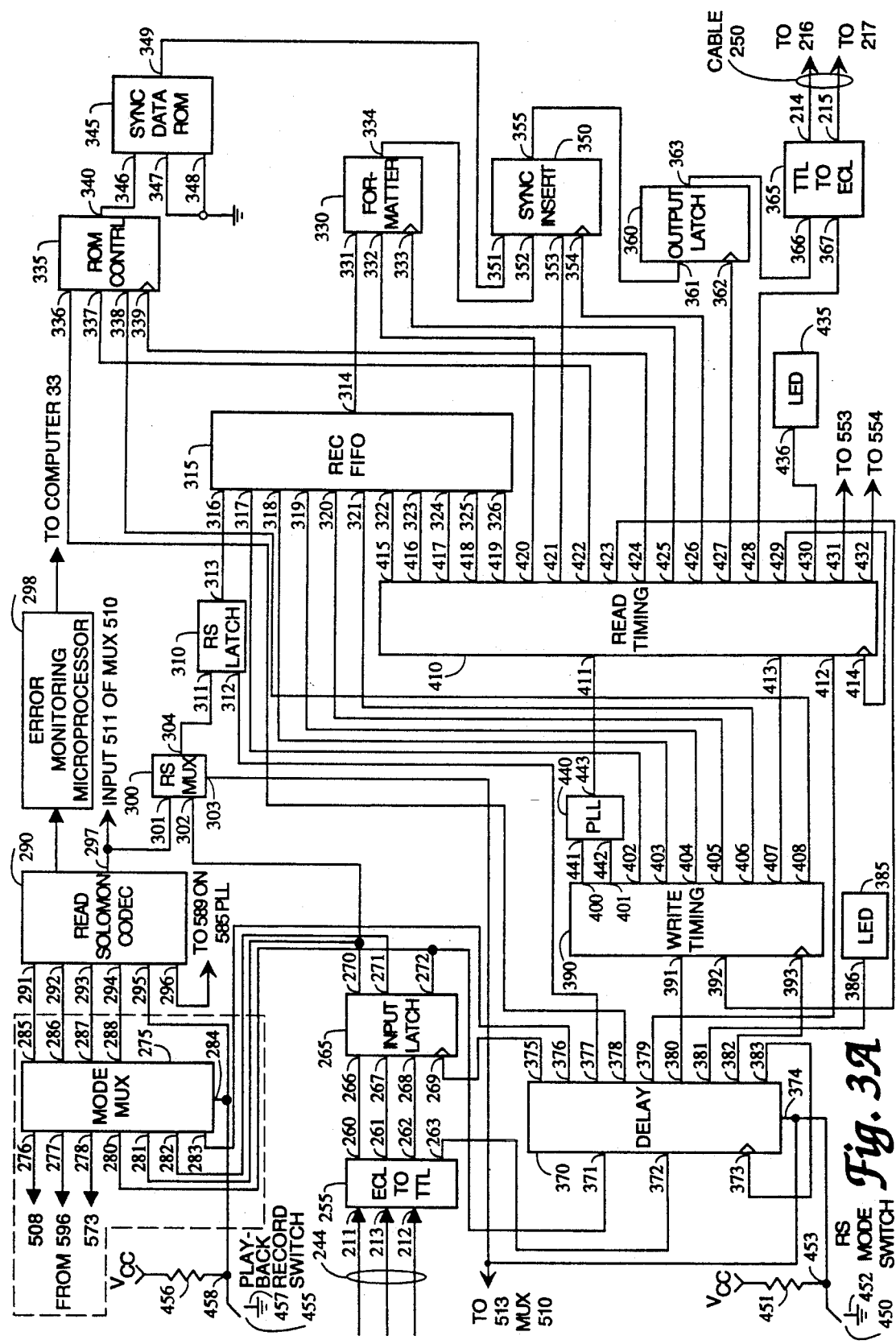
FIGS. 3A and 3B when taken together set forth a more detailed block diagram of the present invention format converter.
Figure 3B:
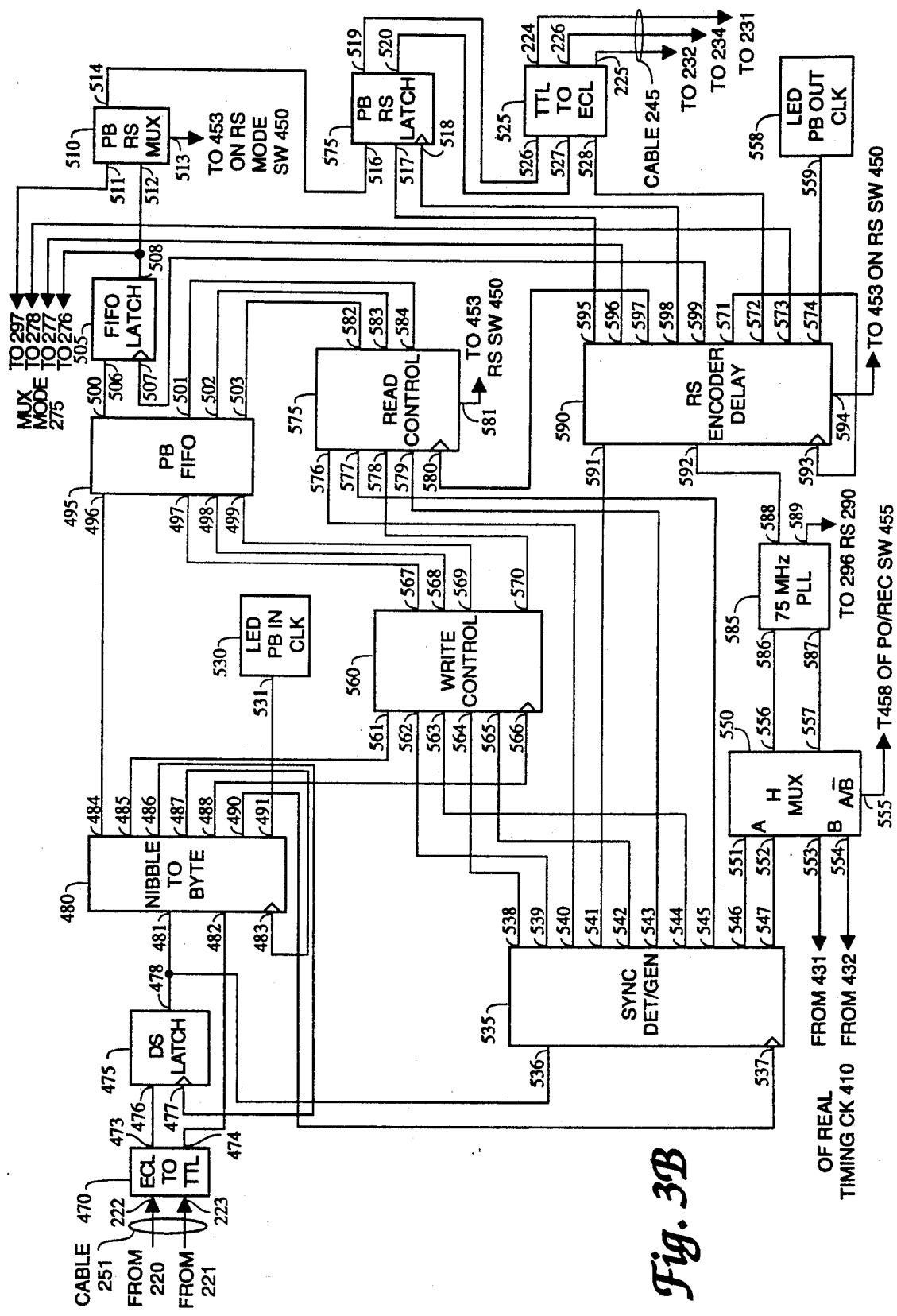

FIGS. 3A and 3B when taken together set forth a detailed block diagram of format converter 210 (seen in FIG. 2). FIG. 3A sets forth the portions of format converter 210 operative during the record operation of digital video tape recorder 32 while FIG. 3B sets forth a detailed block diagram of the portions of format converter 210 operative during the playback operation of digital video tape recorder 32. It will be understood, however, that this distinction is subject to some overlap for system components of format converter 210 which function during both playback and record operations of digital video tape recorder 32.

With specific reference to FIG. 3A, and ECL to TTL logic converter 255 includes a data input 211, a vertical sync input 213 and a clock signal input 212 coupled to outputs 204, 206 and 205 respectively of interface 31 (seen in FIG. 2) via a cable system 244. Logic converter 255 includes a corresponding data output 260 coupled to input 266 of latch 265, a vertical sync signal output 262 coupled to input 268 of latch 265, and a clock signal output 263. An input latch 265 includes a data output 270, a vertical sync output 272 and a clock input 269. A mode multiplex 275 includes a data input 276 coupled to output 508 of latch 505, a vertical sync input 277 coupled to output 596 of delay circuit 590, and a clock signal input 278 coupled to output 573 of delay circuit 590 (all shown in FIG. 3B). Multiplex 275 further includes a data input 281 coupled to output 270 of latch 265, a vertical sync input 280 coupled to output 272 of latch 265, and a clock signal input 283 coupled to output 376 of delay circuit 370. A playback record switch 455 includes a grounded connection 457, an output 458 and a bias resistor 456 coupled to a source of operating supply. Output 458 of switch 455 is coupled to switching input 284 of multiplex 275.

A Reed-Solomon function is incorporated in the format converter in order to provide error control coding and a data error monitoring mode during testing of VTRs or HDVCRs. The data coding function is bypassed during normal record and playback operations at the transmitter and operates in parallel with the record or playback operations. This allows the system operator to exercise real-time monitoring of the quality or error content of the signals as they are passed through the format converter. The data error monitoring function is by microprocessor 298 which is coupled to computer 33 (seen in FIG. 1) for remote operation and control. More specifically, Reed-Solomon codec 290 includes a data input 291 coupled to output 285, a vertical sync input 293 coupled to output 287, and a clock signal input 294 coupled to output 288, a selection signal input 295 coupled to output 458 of switch 455 and an input 296 coupled to output 589 of phase locked loop 585 (seen in FIG. 3B). Reed-Solomon codec 290 further includes an output 297 coupled to input 511 of multiplex 510 (seen in FIG. 3B) and to input 301 of a multiplex circuit 300. An error monitoring microprocessor 298 couples Reed-Solomon codec 290 to error monitoring computer 33 (seen in FIG. 1). Input 302 of multiplex circuit 300 is coupled directly to output 270 of latch 265. A Reed-Solomon mode switch 450 includes a grounded terminal 452, an output 453 and a bias resistor 451 coupled to a source of operating supply. The output of switch 450 is coupled to selection input 513 of multiplex circuit 510 (seen in FIG. 3B) and to selection input 303 of multiplex 300.

A Reed-Solomon data latch 310 includes a data input 311 coupled to output 304 of multiplex 300, a clock input 312, and a data output 313. A record mode fifo 315 includes a Reed-Solomon latch input 316 coupled to output 313 of latch 310. A write enable input 317, a write inhibit input 318, a right reset input 319, and a pair of right clock inputs 320 and 321. Fifo 315 further includes a read enable input 322, a read inhibit 323, a read reset input 324 and a pair of clock inputs 325 and 326. Fifo 315 further includes a data output 314 coupled to input 331 of a data format circuit 330. Format 330 further includes a data input 332, a clock input 333 and a formatted data output 334.

A ROM control circuit 335 includes a vertical sync input 336, a field detect signal input 337, and a horizontal sync input 338. ROM control 335 further includes a clock signal input 339 and an address output 340. A sync data ROM 345 includes an address input 346 and a sync data output 349. A sync insertion circuit 350 includes a sync data input 351 coupled to output 349, a formatted data input 352 coupled to output 334, and a data signal input 353. Sync insertion circuit 350 further includes a clock signal input 354 and a composite data signal output 355. An output latch 360 includes an input 361 coupled to output 355, a clock signal input 362, and a data output 363. A TTL to ECL logic converter 365 includes a data input 366 coupled to output 363, a clock signal input 367, a data output 214, and a clock signal output 215. Outputs 214 and 215 are coupled to inputs 216 and 217 of digital video tape recorder 32 (seen in FIG. 2) via a cable system 250.

A Reed-Solomon delay circuit 370 includes a vertical sync signal input 371 coupled to output 272, a clock signal input 372 coupled to clock signal output 263, a clock signal input 273, and a selection signal input 374 coupled to output 453 of mode switch 450. Reed-Solomon delay circuit 370 further includes clock signal outputs 375, 376 and 377 coupled to clock signal inputs 269, 283 and 312 respectively. Delay circuit 370 further includes vertical sync signal outputs 378, 379 and 380 coupled to sync inputs 336, 412 and 391 respectively. Delay circuit 370 further includes a clock test signal output 381 coupled to an input 386 of an LED indicator 385, a clock signal output 382 coupled to clock signal input 393, and a clock signal output 383 coupled to clock signal input 373 of delay circuit 370. A write timing circuit 390 includes a vertical sync input 391 coupled to output 380, a field one detector signal input 392, and a clock signal input 393 coupled to output 382 of delay circuit 370. Write timing circuit 390 further includes a pair of clock signal inputs 400 and 401 coupled to outputs 441 and 442 respectively of phase locked loop 440. Timing circuit 390 further includes a pair of write enable signal outputs 402 and 403 coupled to inputs 317 and 318 of fifo 315, a write reset signal output 404 coupled to reset input 319 of fifo 315, a pair of write clock signal outputs 405 and 406 coupled to clock inputs 320 and 321 respectively of fifo 315, and a pair of horizontal sync outputs 407 and 408 coupled to inputs 413 of read timing circuit 410 and input 338 of ROM control 335 respectively.

A read timing circuit 410 includes a clock signal input 411 coupled to output 443 of phase locked loop 440, a vertical sync input 412 coupled to output 379 of delay circuit 370, a horizontal sync input 413 coupled to horizontal sync output 407 of timing circuit 390 and a clock signal input 414. Read timing circuit 410 further includes a pair of read enable outputs 415 and 416 coupled to read enable inputs 322 and 323, a read reset output 417 coupled to reset input 324, and a pair of clock signal outputs 418 and 419 coupled to clock signal inputs 325 and 326 of fifo 315. Read timing circuit 410 further includes a data output 420 coupled to data input 332 of formatter 330, a data output 421 coupled to data input 353 of sync insertion circuit 350, and a field to detection signal output 422 coupled to field to input 337 of ROM control 335 and a field one detection signal output 423 coupled to input 392 of write timing circuit 390. Read timing circuit 410 further includes a plurality of clock signal outputs 424 through 429 coupled to clock signal inputs 339, 333, 354, 362, 367 and 414 of formatter 330, sync insertion circuit 354, output latch 360, logic converter 365 and read timing circuit 410 respectively. Read timing circuit 410 also includes a test signal output 430 coupled to input 436 of record display 435.

In operation, logic converter 255 receives the output data signal, vertical sync signal, and clock signal from interface 31 (seen in FIG. 2) in an ECL logic format and converts the received signals to a corresponding set of TTL logic signals. Input latch 265 reclocks the data and vertical sync signals and couples them to mode multiplex circuit 275 and Reed-Solomon multiplex circuit 300. Mode multiplex circuit 275 selects the input signals processed by Reed-Solomon codec 290 in accordance with the configuration of playback record switch 455. In the record mode, switch 455 is open producing a high signal output at output 458 which switches mode multiplex circuit 275 to receive the reclocked data from input latch 265. Concurrently, the open condition of playback record switch 455 also configures Reed-Solomon codec to do data encoding used during the record mode operation of format converter 210. The Reed-Solomon error processed output signal of codec 290 is coupled to Reed-Solomon multiplex circuit 300. The output data of latch 265 is also coupled directly to the remaining input of multiplex circuit 300. Reed-Solomon multiplex 300 selects either the Reed-Solomon output signals to provide a Reed-Solomon active mode of operation or the directly communicated data from latch 265 when the Reed-Solomon error correction system is inactive. Reed-Solomon multiplex 300 is controlled by the condition of Reed-Solomon mode switch 450. With switch 450 in the open condition, output 453 of switch 450 goes high producing a selection signal at multiplex 300 which selects or couples the Reed-Solomon processed output signal to Reed-Solomon latch circuit 310. In the event Reed-Solomon mode switch 450 is closed, output 453 assumes a low voltage condition causing Reed-Solomon multiplex circuit 300 to couple the data directly from latch circuit 265 to Reed-Solomon latch 310.

In either event, Reed-Solomon latch circuit 310 reclocks the received data from multiplex circuit 300 in accordance with the delayed clock signal provided by Reed-Solomon delay circuit 370. The reclocked output signal of Reed-Solomon latch 310 is thereafter coupled to record fifo circuit 315. Fifo circuit 315 receives the data from Reed-Solomon latch 310 by writing it into a first in/first out memory at a clock rate of one hundred and seventy one times the horizontal frequency. To provide a reclocked output data signal at the clock rate required for operation of digital video tape recorder 32, fifo 315 reads out the stored data using a 14.3 megahertz clock which is provided by phase locked loop 440. The 14.3 megahertz signal corresponds to four times the NTSC chrominance subcarrier frequency of 3.58 megahertz. Thus, fifo 315 inputs data at the clock rate used by interface 31 and outputs data at the clock rate utilized by digital video tape recorder 32. The reclocked data signal is then applied to formatter circuit 330 which formats the eight bit data received from interface 31 (seen in FIG. 2) to pairs of four bit pieces corresponding to the four bit format utilized by digital video tape recorder 32. This conversion or reformatting is accomplished within formatter 330 by taking each byte of data received from fifo 315 and splitting in into two four bit pieces. A four bit code is prepended to each four bit piece thus creating two new bytes of code for the digital video tape recorder. This reformatting is required due to the restricted data values reserved for sync signal levels within tape recorder 32. Because tape recorder 32 also has restrictions on the range of data it receives, formatter circuit 330 must encode the eight bit data in a manner not conflicting with the reserved data values of digital tape recorder 32.

The synchronizing signal data is processed by ROM control 335 and sync data ROM 345. ROM control 335 receives horizontal and vertical sync from write timing circuit 390 and Reed-Solomon delay circuit 370 respectively. ROM control 335 also receives clock signal from retiming circuit 410 and a field to detection signal also from read timing circuit 410. Sync data ROM 345 contains stored digital horizontal and vertical sync patterns which are required by digital video tape recorder 32. Thus, ROM control 335 processes the applied synchronizing signal inputs and field to input signal to provide appropriately timed addressed information which is applied sync data ROM 345 to output the required horizontal and vertical sync data patterns used by video tape recorder 32. These sync data patterns are applied to sync insertion circuit 350 together with the formatted data signals from formatter 330. Sync insertion circuit 350 selects between the sync and formatted data inputs at the appropriate time and outputs an NTSC-like line of data which contains both data information and synchronizing data as required by digital video tape recorder 32.

Output latch 360 reclocks the combined data output of sync insertion circuit 350 after which logic converter 365 converts the data from TTL to ECL logic format which is then coupled to digital video tape recorder 32 via cable system 250.

During the above-described recording process, Reed-Solomon delay circuit 370 is operative to provide clocking and timing functions for use by format converter 210. LED circuit 385 activates a light emitting diode indicator when the system is receiving a clock signal having a frequency one hundred seventy one times the horizontal scan frequency. Write timing circuit 390 provides the write control signals for operating record fifo 315 in the manner described above. Similarly, read timing circuit 410 provides the read control signals for record fifo 315 utilized in the manner described above for outputting the data at the required 14.3 megahertz clock signal frequency. Light emitting diode circuit 435 responds to the presence of 14.3 megahertz clock signal to activate an indicating LED for record output indication. Phase locked loop 440 provides a stable 14.3 megahertz clock signal which is phase and frequency locked to the incoming clock signal having a frequency one hundred and seventy one times the horizontal scan frequency. In its preferred form, phase locked loop 440 is a digital sampling type phase locked loop utilizing the input reference frequency of the horizontal scan frequency which is obtained from frequency dividing the clock signal having a frequency one hundred seventy one times the horizontal scan frequency.

Thus, in the record mode, format converter 210 receives the output data of interface 31 (seen in FIG. 2) having a parallel data stream utilizing a clock frequency one hundred seventy one times the horizontal scan frequency. The applied input signal comprises eight bit parallel data which is converted by format converter 210 to four bit data having a clock signal frequency of 14.3 megahertz. In addition, format converter 210 accommodates the data restrictions of digital video tape recorder 32 and configures the data to avoid interference or conflict with this data restriction.

FIG. 3B sets forth a block diagram of format converter 210 operative in the playback mode. It should be understood by those skilled in the art that certain portions of format converter 210 shown and described in FIG. 3A are also operative during the playback operation. For example, Reed-Solomon mode switch 450, playback record switch 455, mode multiplex circuit 275, and Reed-Solomon codec circuit 290 are all shown and described in FIG. 3A but should be understood to also be operative in combination with the playback portion of format converter 210 shown and described in FIG. 3B.

More specifically and with reference primarily to FIG. 3B, format converter 210 includes a logic converter 470 having a data input 222 and a clock input 223 coupled to outputs 220 and 221 respectively of digital video tape recorder 32 (seen in FIG. 2) via a cable system 251. Logic converter 470 includes a data output 473 coupled to data input 476 of a data latch 475. Logic converter 470 also includes a clock signal output 474. Data latch 475 further includes a clock signal input 477 and a data output 478. A nibble to byte converter 480 includes a data input 481 coupled to output 478 of latch 475, a clock input 482 coupled to output 474 of logic converter 470, and a clock signal input 483. Nibble to byte 480 further includes a data output 484, a clock signal output 485 having a frequency twice the NTSC chrominance of carrier, and a plurality of clock signal outputs 486 through 490 each producing an output clock signal having a frequency four times the NTSC chrominance of carrier. Output 490 is coupled to clock signal input 483 of nibble to byte converter 480. A clock signal test output 491 is coupled to an input 531 of an indicator circuit 530.

A playback FIFO memory 495 includes a data input 496, a write clock input 497, a write reset 498 and a write enable input 499. A write control circuit 560 includes a clock input 561 coupled to output 485 of nibble to byte converter 480, a vertical sync input 562, a horizontal sync input 563, a horizontal reference signal input 564, a data input 565, and a clock input 566 coupled to clock output 488 of nibble to byte converter 480. Write control 560 further includes a write clock output 567, a write reset output 568, and a write enable output 569 coupled to inputs 497, 498 and 499 respectively of playback fifo 495. Write control 570 further includes an enabling signal output 570.

A read control 575 includes a vertical sync input 576, a horizontal sync input 577 and an enabling signal input 578 coupled to output 570 of write control 560, a vertical sync input 579, and a clock signal input 580. Read control 575 further includes a selection signal input 581 coupled to output 453 of Reed-Solomon switch 450 (seen in FIG. 3A). Read control 575 further includes a read enable output 582, a read reset output 583, and a read clock output 584 coupled to inputs 501 through 503 respectively of playback fifo circuit 495.

Sync detector/generator 535 includes a data input 536 coupled to output 478 of data latch 475 and a clock signal input 537 coupled to clock signal output 490 of nibble to byte converter 480. Sync detector/generator 535 further includes a horizontal reference signal output 538 and a vertical sync output 539 coupled to inputs 564 and 562 respectively of write control 560. Sync detector/generator 535 further includes a vertical sync output 540 coupled to input 576 of read control 575 and a vertical sync output 541. Sync detector/generator 535 further includes a read data output 542 coupled to input 565 of write control 560, a vertical sync signal output 543 coupled to input 579 of read control 575, a horizontal sync signal output 544 coupled to input 563 of write control 560, and a horizontal sync output 545 coupled to input 577 of read control 575. Sync detector/generator circuit 535 also includes a pair of phase locked loop control signal outputs 546 and 547. A seventy five megahertz phase locked loop 585 includes a pair of control signal inputs 586 and 587 and a pair of clock signal outputs 588 and 589. Output 589 is coupled to input 296 of Reed-Solomon codec circuit 290 (seen in FIG. 3A). A horizontal multiplex circuit 550 includes a pair of inputs 551 and 552 coupled to outputs 546 and 547 respectively and a pair of inputs 553 and 554 coupled to outputs 431 and 432 of read timing circuit 410 (seen in FIG. 3A). Multiplex circuit 550 further includes a selection input 555 coupled to output 458 of playback record switch 455 (seen in FIG. 3A) and a pair of outputs 556 and 557 coupled to inputs 586 and 587 respectively of phase locked loop 585.

A Reed-Solomon encoder delay 590 includes a vertical sync input 591 coupled to vertical sync output 541 of sync detector/generator 535, a clock signal input 592 coupled to output 588 of phase locked loop 585, a clock signal input 593, and a selection signal input 594 coupled to output 453 of Reed-Solomon switch 450. Delay circuit 590 includes a vertical sync output 595 and a vertical sync output 596 coupled to input 277 of mode multiplex circuit 275 (seen in FIG. 3A). Delay circuit 590 includes a clock signal output 597 coupled to clock signal input 580 of read control 575, a clock signal output 598, and a clock signal output 599, and a clock signal output 571 coupled to clock signal input 593 of delay circuit 590. Delay circuit 590 includes a clock signal output 572 and a clock signal output 573 coupled to input 278 of mode multiplex circuit 275 (seen in FIG. 3A). A playback indicator circuit 558 includes an input 559 coupled to test signal output 574 of encoder delay circuit 590.

A fifo latch circuit 505 includes a data input 506 coupled to output 500 of playback fifo circuit 495, a clock signal input 507 coupled to output 599 of delay circuit 590, and an output 508 coupled to input 276 of mode multiplex circuit 275. A Reed-Solomon multiplex circuit 510 includes a data input 511 coupled to output 297 of Reed-Solomon codec 290, a data input 512 coupled directly to output 508 of fifo latch 505 and a selection signal input 513 coupled to output 453 of Reed-Solomon mode switch 450 (seen in FIG. 3A). A Reed-Solomon latch circuit 515 includes a data input 516 coupled to output 514 of multiplex circuit 510, a vertical reset signal input 517 coupled to output 595 of delay circuit 590 and a clock signal input 518 coupled to clock signal output 598 of delay circuit 590. Latch 515 further includes a data output 519 and a vertical sync signal output 520. A logic converter 525 includes a data input 526 and a vertical sync signal input 527 coupled to outputs 519 and 520 respectively of latch circuit 515. Logic converter 525 further includes a clock signal input 528 coupled to output 572 of delay circuit 590. Logic converter 525 includes a data output 224, a vertical reset signal output 226 and clock output 225 coupled to inputs 231, 234 and 232 respectively of interface 31 (seen in FIG. 3A) via a cable system 245.

In operation, the output data and clock signals from digital video tape recorder 32 are coupled to logic converter 470 by cable system 251 in an emitter-coupled-logic format. Converter 470 converts the emitter-coupled-logic input signals to transistor transistor data and clock signals which are coupled to input latch 475 and nibble to byte converter 480 respectively. Latch circuit 475 receives a clock signal from nibble to byte converter 480 and in response thereto, reclocks the data signal which is then applied to nibble to byte converter 480 and to sync detector/generator 535. Nibble to byte converter 480 receives the two byte data stream and strips off the upper four bits and combines the lower four bits into the original eight bit byte of the type processed by interface 31 In essence, nibble to byte converter 480 performs the reciprocal function of formatter 330 (seen in FIG. 3A). The reconfigured data output of nibble to byte converter 480 is then coupled to playback fifo circuit 495. Fifo 495 receives data in a first in first out manner at a clock rate of 14.3 megahertz. Fifo 495 outputs the data at the high definition television receiver clock rate having a frequency one hundred seventy one times the horizontal scan frequency. This output clock signal is provided by phase locked loop 585. The reclocked data from fifo 495 is coupled to latch circuit 505 which further reclocks the data in accordance with the clock signal output provided by Reed-Solomon delay circuit 590. The output data of latch 505 is coupled directly to one input of Reed-Solomon multiplex 510 and to the playback data input of mode multiplex circuit 275 (seen in FIG. 3A) Multiplex circuit 275 supplies data to the input of Reed-Solomon codec 290, the output of which is coupled to the remaining input of Reed-Solomon multiplex 510. The selection control of Reed-Solomon multiplex 510 is provided by Reed-Solomon mode switch 450 (seen in FIG. 3A).

With temporary reference to FIG. 3A, it should be recalled that playback record switch 455 is closed to select the playback mode of operation for format converter 210. Accordingly, the closure of playback record switch 455 produces a low voltage state at output 458 which causes mode multiplex circuit 275 to switch the input to Reed-Solomon codec 290 to the playback data provided by latch circuit 505. The output of Reed-Solomon codec 290 is then available at one input of Reed-Solomon multiplex circuit 510. As mentioned, Reed-Solomon multiplex circuit 510 (seen in FIG. 3B) responds to the condition of Reed-Solomon mode switch 450. With Reed-Solomon mode switch in an open condition, a high voltage state is provided at output 453 of switch 450. Conversely, with Reed-Solomon mode switch 450 closed, output 453 thereof is maintained at a low voltage condition.

Returning to FIG. 3B, the output voltage condition of Reed-Solomon mode switch 450 is used to control Reed-Solomon multiplex circuit 510 and Reed-Solomon delay circuit 590. Thus, with Reed-Solomon mode switch 450 open, Reed-Solomon encoder delay 590 is operative and Reed-Solomon multiplex circuit 510 couples the Reed-Solomon processed data to latch circuit 515. Conversely, with Reed-Solomon switch 450 configured to exclude Reed-Solomon processing, the signal provided by switch 450 disables delay circuit 590 and switches multiplex circuit 510 to the direct coupling from latch 505. The selected output data from Reed-Solomon multiplex 510 is reclocked by latch circuit 515 and converted to emitter-coupled-logic signals by converter 525 and thereafter applied to interface 31 via cable 245.

Playback indicator circuit 530 detects the data clock signal utilized by nibble to byte converter 480 and activates a playback indicator LED to indicate playback operation. Sync detector/generator 535 processes the digital video tape recorder synchronizing signals from the output data of latch 475 and generates vertical and horizontal sync signals for interface 31 (seen in FIG. 2). In addition, sync detector/generator 535 also generates timing and control signals for phase locked loop 585. Horizontal multiplex circuit 550 selects playback phase locked loop control signals when format converter 210 is operating in the playback mode or selects record phase locked loop control signals received from read timing circuit 410 (seen in FIG. 3A) when the format converter is operating in the record mode.

Write control 560 generates write control signals for the proper timing of signal input to playback fifo 495. Read control 575 generates read control signals for the proper timing of data output from playback fifo 495. Phase locked loop 585 provides a clock signal for interface 31 having a frequency one hundred and seventy one times the horizontal scan frequency and the clock signal for the Reed-Solomon error monitoring hardware having a frequency six hundred eighty four times the horizontal scan frequency. Phase locked loop 585 is phase and frequency locked to the input sample horizontal scan signal provided by sync detector/generator 535 using a countdown from 14.3 megahertz clock signals. Reed-Solomon encoder delay 590 provides clock and timing signals for Reed-Solomon codec 290 (seen in FIG. 3A) as well as fifo 495, latch 505, latch 515 and logic converter 525. Playback indicator 558 responds to the presence of clock signal at encoder delay 590 and energizes a playback output indicating LED.

What has been shown is a format converter for use with high definition television signals having different formats to facilitate the playing and recording of a digital video tape recorder in cooperation with a high definition television transmitter or the like. The system provides data reclocking to adapt the high definition television type to the NTSC-like format of the digital video tape recorder. The system provides data resyncing to adapt the HDTV synchronization to the VTR synchronization. The format converter shown is bilateral and operates during both record and playback modes of video tape recorder operation. The system provides data reformatting which serves to adapt the binary type data of the high definition television system to the more restricted data range required by the digital tape recorder. The converter performs an error protection and monitoring function in accordance with the selection of Reed-Solomon encoder or decoder processing during test modes of operation. A plurality of stored synchronizing signal patterns within the format converter permit the converter to synthesize the sync blanking and equalization signals which are required by the digital video tape recorder. In the record mode, data is received from the high definition television interface in a continuous stream of five hundred twenty five NTSC-like lines. The data is retimed by the format converter in order to permit uninterrupted data input from the high definition television interface. On the transmitter side, the data runs in a continuous mode as required by the HDTV system while on the VTR side, the data runs in burst modes. As required by the VTR, i.e. there is no data running during the horizontal blanking interval or vertical blanking interval.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a high definition television system in which digital high resolution image and synchronizing data are processed in a compressed format, a format conversion method for interfacing said system with a digital video tape recorder, said format conversion method comprising the steps of:

receiving compressed high definition television image and synchronizing data in a first format characterized by first clock rate binary data having data timing related to the horizontal and vertical scan signals of said television system;

reclocking said image and synchronizing data to a second data clock rate to produce reclocked image and synchronizing data;

reformatting said reclocked image and synchronizing data from binary to a restricted range data format to produce reformatted restricted range image and synchronizing data;

resynchronizing said reformatted restricted range image and synchronizing data from HDTV continuous mode to VTR discontinuous or burst mode;

storing a plurality of restricted range synchronizing and blanking data patterns;

recovering said synchronizing data from said received image and synchronizing data;

retrieving said restricted range synchronizing and blanking data patterns;

inserting said restricted range synchronizing and blanking data patterns into said reformatted restricted range image and synchronizing data in a timed relationship responsive to said synchronizing data; and applying said reformatted reclocked restricted range image and synchronizing data and inserted restricted range synchronizing and blanking data patterns to a digital video tape recorder.

2. The method of claim 1 wherein said reformatting step includes the steps of:

dividing each byte of binary data into a plurality of smaller data bytes; and prepending a bit code to each smaller data byte to create a plurality of new data bytes.

3. The method of claim 2 wherein said storing step includes the step of providing an address for each data pattern and wherein said retrieving step includes the steps of:

receiving said synchronizing data; and addressing and outputting said stored data patterns in response to said synchronizing data.

4. The method of claim 3 wherein said reclocking step includes the steps of:

storing said image and synchronizing data at said first data clock rate; and outputting said image and synchronizing data at said second data clock rate.

5. The method of claim 4 wherein said dividing step includes splitting each byte into two smaller data bytes and wherein said prepending step uses a bit code equal to said divided bytes.

6. The method of claim 5 wherein said binary data is eight bit data and said prepended bit code is four bit.

7. In a high definition television system in which digital high resolution image and synchronizing data are processed in a compressed format, format conversion means for interfacing said system with a digital video tape recorder, said format conversion means comprising:

means for receiving compressed high definition television image and synchronizing data in a first format characterized by first clock rate binary data having data timing related to the horizontal and vertical scan signals of said television system;

means for reclocking said image and synchronizing data to a second data clock rate to produce reclocked image and synchronizing data;

means for reformatting said reclocked image and synchronizing data from binary to a restricted range data format to produce reformatted restricted range image and synchronizing data;

means for resynchronizing said reformatted restricted range image and synchronizing data from HDTV continuous mode to VTR discontinuous or burst mode;

means for storing a plurality of restricted range synchronizing and blanking data patterns;

means for recovering said synchronizing data from said received image and synchronizing data;

means for retrieving said restricted range synchronizing and blanking data patterns;

means for inserting said restricted range synchronizing and blanking data patterns into said reformatted restricted range image and synchronizing data in a timed relationship responsive to said synchronizing data; and means for applying said reformatted reclocked restricted range image and synchronizing data and inserted restricted range synchronizing and blanking data patterns to a digital video tape recorder.

8. Format conversion means as set forth in claim 7 wherein said means for reformatting includes:

means for dividing each byte of binary data into a plurality of smaller data bytes; and means for prepending a bit code to each smaller data byte to create a plurality of new data bytes.

9. Format conversion means as set forth in claim 8 wherein said means for storing includes means for providing an address for each data pattern and wherein said means for retrieving includes:

means for receiving said synchronizing data; and means for addressing and outputting said stored data patterns in response to said synchronizing data.

10. Format conversion means as set forth in claim 9 wherein said means for reclocking includes:

means for storing said image and synchronizing data at said first data clock rate; and means for outputting said image and synchronizing data at said second data clock rate.

11. Format conversion means as set forth in claim 10 wherein said means for dividing includes means for splitting each byte into two smaller data bytes and wherein said means for prepending uses a bit code equal to said divided bytes.

12. Format conversion means as set forth in claim 11 wherein said binary data is eight bit data and said prepended bit code is four bit.

13. In a high definition television system in which digital high resolution image and synchronizing data are processed in a compressed format, a format conversion method for interfacing said system with a digital video tape recorder, said format conversion method comprising the steps of:

receiving compressed high definition television image and synchronizing data from a digital video tape recorder in a format characterized by restricted range data having periodically inserted synchronizing and blanking data patterns and having first data clock rate;

reclocking said compressed high definition television image and synchronizing data to a reclocked signal having a second data clock rate;

reformatting said reclocked signal to reclocked binary data;

detecting said synchronizing and blanking patterns in said reclocked binary data and producing high definition television scan synchronizing and blanking data in synchronism therewith; and applying said reclocked binary data and said high definition television scan synchronizing and blanking data produced in said detecting step to said high definition television system.

14. The method of claim 13 wherein said reformatting step includes the steps of:

stripping each upper one half bit code from each data byte in said restricted range data and combining the remaining lower bits to form unrestricted value binary data bytes.

15. The method of claim 14 wherein said reclocking step includes the steps of:

storing said image and synchronizing data at said first data clock rate; and outputting said image and synchronizing data at said second data clock rate.

16. The method of claim 15 wherein said restricted range data includes pairs of four bit bytes and said stripping step includes removing the upper four bits thereof and forming eight bit binary bytes therefrom.

17. In a high definition television system in which digital high resolution image and synchronizing data are processed in a compressed format, format conversion means for interfacing said system with a digital video tape recorder, said format conversion means comprising:

means for receiving compressed high definition television image and synchronizing data from a digital video tape recorder in a format characterized by restricted range data having periodically inserted synchronizing and blanking data patterns and having a first data clock rate;

means for reclocking said compressed high definition television image and synchronizing data to a reclocked signal having a second data clock rate;

means for reformatting said reclocked signal to reclocked binary data;

means for detecting said synchronizing and blanking patterns in said reclocked binary data and producing high definition television scan synchronizing and blanking data in synchronism therewith; and means for applying said reclocked binary data and said high definition television scan synchronizing and blanking data produced in said detecting step to said high definition television system.

18. Format conversion means as set forth in claim 17 wherein said means for reformatting includes:

means for stripping each upper one half bit code from each data byte in said restricted range data; and means for combining the remaining lower bits to form unrestricted value binary data bytes.

19. Format conversion means as set forth in claim 14 wherein said means for reclocking includes:

means for storing said image and synchronizing data at said first data clock rate; and means for outputting said image and synchronizing data at said second data clock rate.

20. Format conversion means as set forth in claim 19 wherein said restricted range data includes pairs of four bit bytes and said means for stripping includes means for removing the upper four bits thereof and forming eight bit binary bytes therefrom.

* * * * *